United States Patent [19]

Maganas et al.

[11] Patent Number: 5,143,745
[45] Date of Patent: Sep. 1, 1992

[54] INTERMITTENT FILM DEPOSITION METHOD AND SYSTEM

[76] Inventors: Thomas C. Maganas, 1200 Ardmore Ave., Manhattan Beach, Calif. 90266; Alan L. Harrington, 2508 Floyd Ave., Modesto, Calif. 95350

[21] Appl. No.: 746,774

[22] Filed: Aug. 16, 1991

[51] Int. Cl.[5] .............................................. B05D 1/20
[52] U.S. Cl. ...................................... 427/8; 427/294; 427/345; 427/434.3; 427/430.1; 118/693; 118/602; 118/402; 118/403; 118/429
[58] Field of Search ................. 427/434.3, 430.1, 294, 427/345, 8; 118/402, 403, 429, 693, 602

[56] References Cited

U.S. PATENT DOCUMENTS

| | | | |
|---|---|---|---|
| 4,093,757 | 6/1978 | Barraud et al. | 118/402 |
| 4,646,678 | 3/1987 | Grunfeld | 118/667 |
| 4,722,856 | 2/1988 | Albrecht et al. | 427/402 |
| 5,035,200 | 6/1991 | Moriyama et al. | 118/693 |

FOREIGN PATENT DOCUMENTS

60-193325 10/1985 Japan .

Primary Examiner—Shrive Beck
Assistant Examiner—Katherine Bareford
Attorney, Agent, or Firm—Marvin H. Kleinberg

[57] ABSTRACT

A method and apparatus for continuously forming and depositing a layer of monomolecular amphiphilic molecules on a substrate, which include the continuous or intermittent removal of unused film after a substrate dipping. The amount of "dwell time" in which the film resides on the surface of the support media is controlled. A rotatable barrier provides a movable "film front" to achieve repeatable film pressures, consistencies and viscosities of high precision and accuracy.

20 Claims, 4 Drawing Sheets

Fig. 3.

INTERMITTENT FILM DEPOSITION METHOD AND SYSTEM

BACKGROUND OF THE INVENTION

1. Field of the Invention

The invention relates to film deposition systems and, more particularly, to a process and apparatus for the continuous or intermittent removal of tractable and intractable Langmuir-Blodgett films on a continuous coating trough.

Langmuir-Blodgett films consist of monomolecular layers of amphiphilic molecules deposited on a substrate of choice. The continuous or intermittent removal of unused film is necessary to maintain a continuous system of thin film at a constant surface, or Wilhelmy, pressure.

Monomolecular layers of organic compounds are important in a number of applications, most recently in the electronics industry where they can be used to form precisely determined dielectric barriers between two otherwise adjacent metal surfaces. In addition to general insulating applications, a more recent discovery, accomplished by the invention described herein, is the deposition of a protective coating over the metallic oxide surface of computer diskettes. The protection afforded by the Langmuir-Blodgett films, which must be laid down with absolute precision, permits the read-write heads of a computer diskette drive to ride much closer to the surface of the diskette, allowing for higher resolutive and more accurate reading and writing, of data to and from the diskette.

2. Description of the Prior Art

The traditional, and originally novel, approach for producing monomolecular layers of amphiphilic substances on a substrate is the Langmuir-Blodgett method, wherein a thin film of the substance to be deposited is first dissolved in a volatile solvent and spread over the surface of water within a rectangular basin. The layer of amphiphilic substance which remains after the solvent evaporates is compressed from one end of the water basin to create the desired concentration of substance, while at the same time a substrate is raised through the two phase system at the other end. Ideally, the Langmuir-Blodgett process deposits a monomolecular layer of amphiphilic substance on the substrate.

The resulting surface is either entirely hydrophilic or hydrophobic depending on the polarity of the substrate to be coated. If the substrate is hydrophilic, the hydrophilic heads of the amphiphilic substance will adhere to the surface of the substrate, leaving the hydrophobic tails on the surface, and the resulting surface is thus hydrophobic. The opposite result is obtained if a hydrophobic substrate were dipped.

More recently, more sophisticated methods of laying down monomolecular films have been developed, each of which attempt to create a system which is more continuous. A continuous system would not require stopping the process in order to clean and restore the system as frequently, as is required in traditional Langmuir-Blodgett methods. Some of the inventions allow for the deposition of heterogeneous layers of thin film through the use of multiple compartments or chambers within the trough.

However, none of the prior art devices achieves a truly continuous system in which the unused film is either continuously or intermittantly removed from the dipping chamber - except by completely shutting down the system and draining out the support media - which shutting down prevents the system from being truly continuous. Thus, the inventions of the prior art all suffer from a general inability to maintain a continuous film of uniform pressure, consistency and viscosity. Furthermore, none of the prior art discusses how to control the "dwell-time" or "residency time"—the time during which the film remains on the surface of the water—which control is necessary in order to achieve the results of this invention.

For example, Barraud, U.S. Pat. Nos. 4,093,757 and 4,224,896, describe a method and device, respectively, which are slight modifications of the original Langmuir-Blodgett method. The water trough is divided into at least two compartments, each divided from the next adjacent compartment by either a rotating cylinder or torus, which act both as a barrier and a means to transfer the amphiphilic film to the next adjacent compartment. The last cylinder (or torus) in the series also compresses the film within the final compartment in which the substrate is to dipped. No means for film removal other than by dipping a substrate are claimed or specified.

Barraud, U.S. Pat. No. 4,511,604 sets forth a process and apparatus for producing alternate monomolecular layers which utilize two separate, but simultaneously operating tanks, containing separate monomolecular films of either the same, or varying, molecular structure. The Device sequentially dips the substrate into the two separate tanks, thus applying alternate monomolecular layers to the substrate. No means for film removal other than by dipping a substrate are claimed or specified.

Barraud, U.S. Pat. No. 4,632,800 specifies a process for producing a film having at least one monomolecular layer of nonamphiphilic molecules, which is achieved by combining or forming a complex between non-amphiphilic and amphiphilic molecules, a monomolecular layer of which is then placed on a desired substrate. No new device for laying down the film is claimed or specified.

Miyazaki U.S. Pat No. 4,674,436 teaches a device for applying at least two different films of varying chemical makeup without the necessity of cleaning the apparatus between batches. This is achieved by dividing the supporting water surface into four different chambers, separated from one another by floating arms. However, no method for removing unused film is either claimed or taught.

Saito U.S. Pat. No. 4,716,851 describes an apparatus utilizing the traditional Langmuir-Blodgett method of forming thin films, but which has the ability to lay down successive monomolecular layers of film on an already curved surface in order to alter the shape and form a new curved surface containing carefully placed layers of thin film. The patent does not contain any information or claim relating to the removal of unused film.

Albrecht, U.S. Pat. Nos. 4,722,856 and 4,783,348, set forth a method and apparatus which contains a series of compartments similar to Barraud, U.S. Pat. Nos. 4,093,757 and 4,224,896, but which uses a flow of water to transfer the film between compartments and also to compress the film. Albrecht claims an advantage over Barraud because it uses water instead of a moving cylinder to create the desired surface pressure, obviating the need to be retooled when using a different type of film. Although U.S. Pat. No. 4,722,856 claims to be a "continuous" system, it is not continuous in the same sense as the present invention because, like the other prior art, Albrecht neither describes nor claims a means for the continuous removal of unused film in order to maintain a truly continuous flow.

Ono, U.S. Pat. No. 4,779,562, teaches a simple variation of the traditional Langmuir-Blodgett method in which the thin film to be deposited is raised and lowered by the supporting liquid rather than the substrate. Regardless of whatever advantage this process might achieve over other methods, One does not provide any means for the continuous removal of unused film.

Wakayama, U.S. Pat. No. 4,848,270, describes a system for the heterocyclic buildup of a variety of different thin films on a single substrate which is comprised of a multi-compartment system, each containing its own film. It is substantially similar in principal, although different in design, to U.S. Pat. No. 4,674,436, which Wakayama failed to cite.

In all of the devices set forth above, there is a tendency for film remaining in the system after the dipping of one or more substrates to undergo hydration, become contaminated, or otherwise be of a different consistency or viscosity from the film being "continuously" fed into the dipping chamber.

The present invention requires no stoppage of the mechanism in order to clean up and/or restore the system to the desired specifications. The systems of the present invention are "continuous", and are capable of automation. The present invention is therefore uniquely suited for large scaled industrial applications requiring processes capable of producing thin films of precise thicknesses.

SUMMARY OF THE INVENTION

The present invention creates a truly continuous film making system which does not require any stoppage for the purpose of cleaning and restoring the system to the desired specifications after film deposition. The present invention allows the introduction of a steady stream of new film into a compression and dipping zone. In addition, the present invention allows the intermittent introduction and removal of film in a batch method so that substrates can first be dipped into the dipping well without any film residing on the surface. Film is then spread over the surface of the trough. When the film has reached optimal surface pressure, the substrate is lifted out of the trough. The latter embodiment is preferred where only one monomolecular layer is intended, while the former will form a layer of film on the substrate both when dipped and withdrawn.

A Wilhelmy pressure transducer is directly interfaced with a cylinder barrier/transporter, which slows down and speeds up, depending on the rate of film depletion resulting from the dipping process. The cylinder can either maintain a continuous film in the dipping region, or can allow for complete removal of all unused film between batches if the batch method is desired.

A constant film of constant Wilhelmy pressure can then be produced and maintained, regardless of the size or rate of dipping of the substrate in question. In addition, because the cylinder barrier-transporter continuously removes unused film, which would otherwise remain in the compression and dipping zone, the present invention allows for the control of dwell time, which is crucial in maintaining the consistency of the film to be deposited.

The present invention is concerned with two basic categories of amphiphilic thin films which can be prepared on a water surface—"tractable and intractable". These terms describe the "respreadability" of the films, which is a purely a mechanical property. Many different films of numerous chemical structures, which are either tractable or intractable, can be used.

A tractable film is one that can flow and be "respread" over the surface of a supporting medium such as water to fill in any "gap" in the film caused by the deposition of a film upon a substrate. Film which initially migrates toward the sides of the trough can and will flow back toward the center of the trough in the compression and dipping zone, when a momentary depletion of thin film is created by the dipping of a substrate. This has the effect of causing a drop in the surface pressure of the film. Before the next substrate is to be dipped the pressure must be restored.

In the case where the batch method is preferred, it is necessary to remove all of the old film from the dipping area, which has a tendency to migrate into the gaps caused by the coating of the substrate.

It has been found that in the case of tractable films a cylinder equipped with a number of "paddles" works best. Such a "paddle wheel" has a controlled RPM which can be adjusted according to prevailing conditions in order to maintain a continuous film of desired pressure, consistency and viscosity. In that way film pressure, film dwell time, and the removal of excess film which might otherwise build up due to the continuous introduction of new film into the system can all be controlled.

The cylinder paddle chops away a section of the thin film in the compression zone when the paddle first comes in contact with the layer of film on the surface of the water. Next, a "film front", or barrier is formed, which causes the amphiphilic molecules to build up and attain the desired surface pressure conditions in preparation for the dipping of the next substrate.

The film which has been removed from the compression and dipping zone, on the opposite side of the paddle from the film front, is then removed by aspiration from the surface of the water in the removal zone in the rear of the trough.

At least one of the paddles should penetrate the surface of the water at any given moment. Otherwise, the film front, or barrier necessary to maintain the surface pressure of the respreadable, tractable film, will be removed before the next paddle enters the film-water layer to set up the next film front, resulting in a migration of film toward the aspirators, a drop in the surface pressure, and a loss of precise control over the system.

Due to inevitable fluctuations of the water level within the trough, either because of changes in the water pressure of the incoming water, or the varying amounts of water and film drawn away by aspiration, it is necessary to have an independent means of maintaining a constant water level. This ensures that at least one of the paddles penetrates the surface of the water at all times, preventing the film layer and/or water from spilling out of the walls of the trough, thereby destroying the precise conditions maintained by this invention. A bi-directional water pump is regulated by a water level transducer located in the compression and dipping zone. One end of the pump is connected to the base of the dipping well, and the other to a sufficiently large water reservoir.

The rotational velocity of the paddle wheel is regulated by a computerized electronic control which can be set to any desired surface pressure, which pressure is maintained through feedback from a Wilhelmy pressure transducer located within the compression and dipping zone. The Wilhelmy pressure transducer is also attached to a display device so that a technician can tell that the desired conditions are being maintained before the next substrate is to be dipped. Alternatively, the transducer can be connected to a device which lowers and raises the substrate to be dipped, to ensure that the substrate is only dipped when the desired conditions have been reached. In this way, the ability to precisely duplicate desired conditions makes the device uniquely suited for the mass production of thin films of carefully controlled thickness and consistency.

In the alternative, where a batch method is preferred, the paddle wheel initially rotates according to the build up of surface pressure. After the substrate is lifted out of the trough, the paddle wheel will turn rapidly enough to remove all of the remaining unused film still residing on the surface of the support media in the dipping zone.

The critical problem of inadequate control over the "residence time" or "dwell time", that is, the time during which the thin film has remained on the water surface before either dipping or removal, is a problem that is endemic to, but not discussed in, any of the batch mode systems of the prior art, which can be controlled through use of the above described mechanism. This is important, because the viscosity of the thin film changes considerably over time, independent of the surface pressure, apparently due to the film's contact with water.

By increasing or decreasing the volume of thin film initially spread over the surface of the trough, the time in which optimal Wilhelmy pressure, and system equilibrium, can be varied. This, coupled the continuous removal of unused film, creates the ability to control the residence time of the thin film before the substrate is either dipped or pulled out of the trough, thus controlling the consistency of the film.

It has been shown that film viscosity, which is independent of the surface pressure, is greatly dependent upon the time during which the film is in contact with the water surface, and can dramatically affect film properties. The longer a film remains on the water surface, the more viscous it becomes, adversely affecting uniformity and speed of deposition as well as the properties of the film itself.

It is believed that film molecules become hydrated through some unknown mechanism where R is the hydrophobic end of the amphiphilic molecule and P is the polar hydrophilic end.

$$R\text{-}P + xH_2O \rightarrow R\text{-}P(xH_2O) \qquad (1)$$

Different amphiphilic molecules have different rates of hydration based on their relative levels of polarity and affinity for water.

A measure of the change in film properties can be observed by the change of development time for photoresist material. The development time of such material is directly related to the viscosity of the film as it is deposited. By varying the residence time from 3 minutes to 20 minutes, it is possible to change the time required to develop unexposed photoresist material from 20 minutes to 3 minutes. Batch mode systems cannot achieve a constant residence time and thereby are not able to assure a reproducible Langmuir-Blodgett film.

None of the prior art systems, even those that claim a level of continuousness, teach or suggest controlling the dwell time. This is because none of the prior art systems has a means for the continuous removal of unused films which remain on the surface of the water and which can respread after a substrate has been dipped.

Two related problems arise, the first of which involves a scenario in which there is constant and/or repeated dippings of one or more substrates. Film initially spread at any given moment is not immediately used to coat any given substrate, but remains on the surface of the water only to eventually coat a subsequently dipped substrate.

The second involves a scenario where the dipping process has been halted or slowed down considerably, requiring the technician to stop or slow down the introduction of new film in order to avoid plate lockup, or the overlap of molecules. Here, the film simply sits on top of the water until dipping is resumed, or until the system is shut down and cleaned.

The present invention has a built in apparatus and method for the removal of all unused film, so that system never has to be shut down for cleaning between batches, as is required by the inventions embodied in all of the prior art.

In the case of intractable films, or those which do not flow and cannot be respread once they achieve the desired surface pressure, the paddle wheel arrangement described above may not be adequate to remove the semi-solid film which remains in the periphery of the compression and dipping zone following substrate dipping. The cylinder barrier of choice in this case is a rotating cylinder with a hydrophilic filter screen on the exterior, which is partially submerged in the water. In addition, a pulsed vacuum is applied to the interior of the cylinder. A sequence ported rotary vacuum connection permits the release of the vacuum during that portion of the rotational arc where the film is to be scraped off the cylinder. Before the teaching of this invention, Langmuir-Blodgett deposition of intractable films were impracticable or impossible due to pressure control loss when the Wilhelmy pressure control locks up.

Because intractable films do not, by definition, respread themselves over the surface of the water left vacant of film by the dipping of the substrate, they do not fill in the gaps left by the dipped substrate. However, the remaining unused film is absolutely useless and cannot be used again. When the intractable film is prepared for dipping, the substrate must make a slight tear in the film when initially pulled out of the trough. After the dipping, the film which remains in the peripheral region of the compression and dipping zone is essentially useless and must be removed.

A paddle wheel tends to cause uneven removal of the remaining film due to its semi-solid nature, resulting in an uneven film front for the subsequent formation of new film. With the use of the vacuum cylinder, uniform removal of unused intractable film is effectively achieved, thereby maintaining a substantially continuous system.

It is important that the surface of the vacuum cylinder be comprised of a hydrophilic, rather than hydrophobic, filter screen so that the film will adhere to the cylinder only while a vacuum is applied. As noted above, when the vacuum is released the unused film can be removed by means of a scraper. Since the hydrophilic end of each amphiphilic molecule orients itself in the direction of the water surface, the surface of the film which comes in contact with the cylinder will be comprised entirely of the hydrophobic ends, which does not adhere to a hydrophilic surface.

The scraper can be made of any rigid material which can be pressed into the side of the cylinder with sufficient force to remove all of the unused film, but should be smooth enough so that it will not scratch or otherwise damage the filter screen. A blade of hardened non-stick plastic, or a blade of any substance coated with teflon, have been found to be satisfactory.

DETAILED DESCRIPTION OF THE INVENTION

Figures 1, 1A:
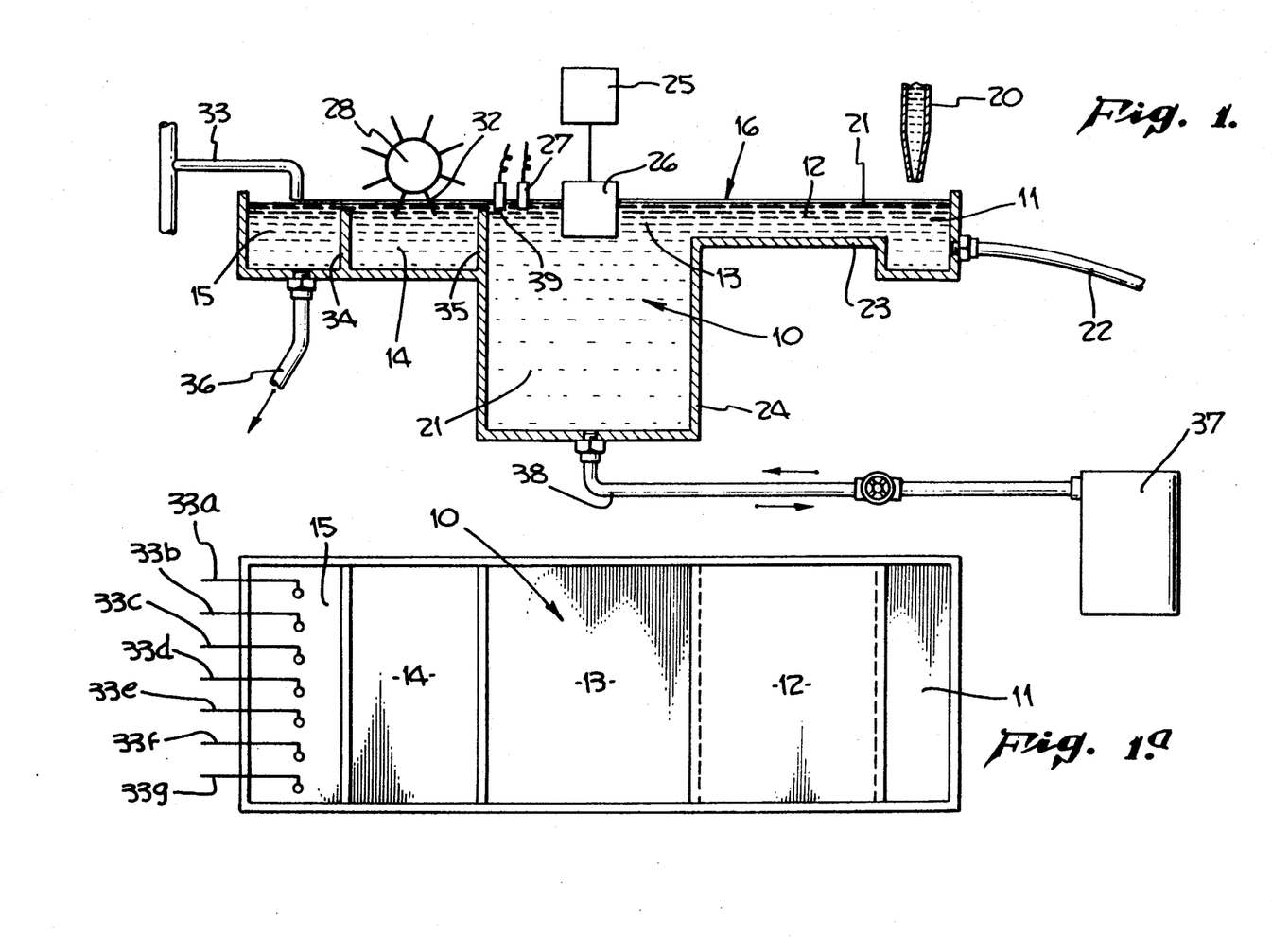
FIG. 1 is a side section view of one embodiment of the present invention which utilizes a paddle wheel.
FIG. 1(a) is a top view of the apparatus of FIG. 1.
Figures 2, 2A:
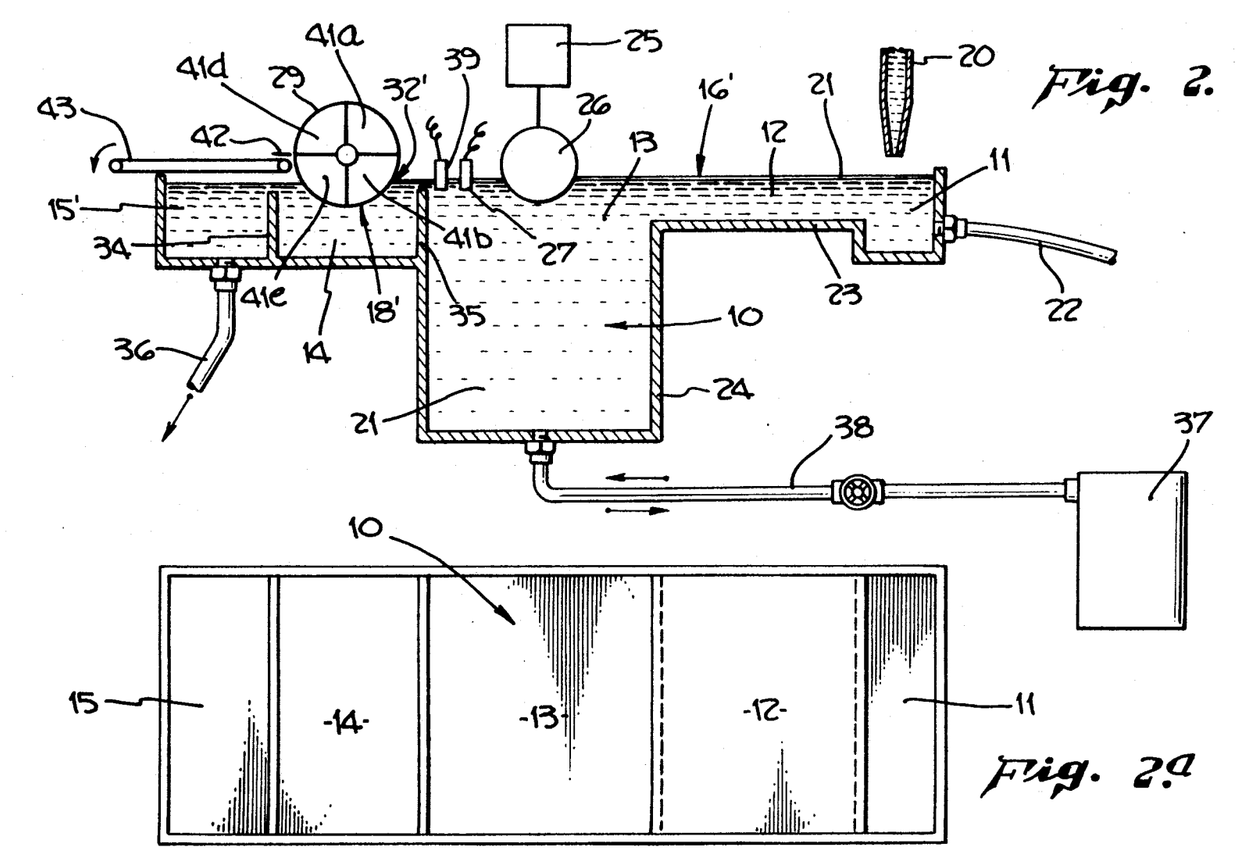
FIG. 2 is a side section view of an alternate embodiment of the present invention which utilizes a hollow cylinder.
FIG. 2(a) is a top view of the apparatus of FIG. 2.
Figure 3:
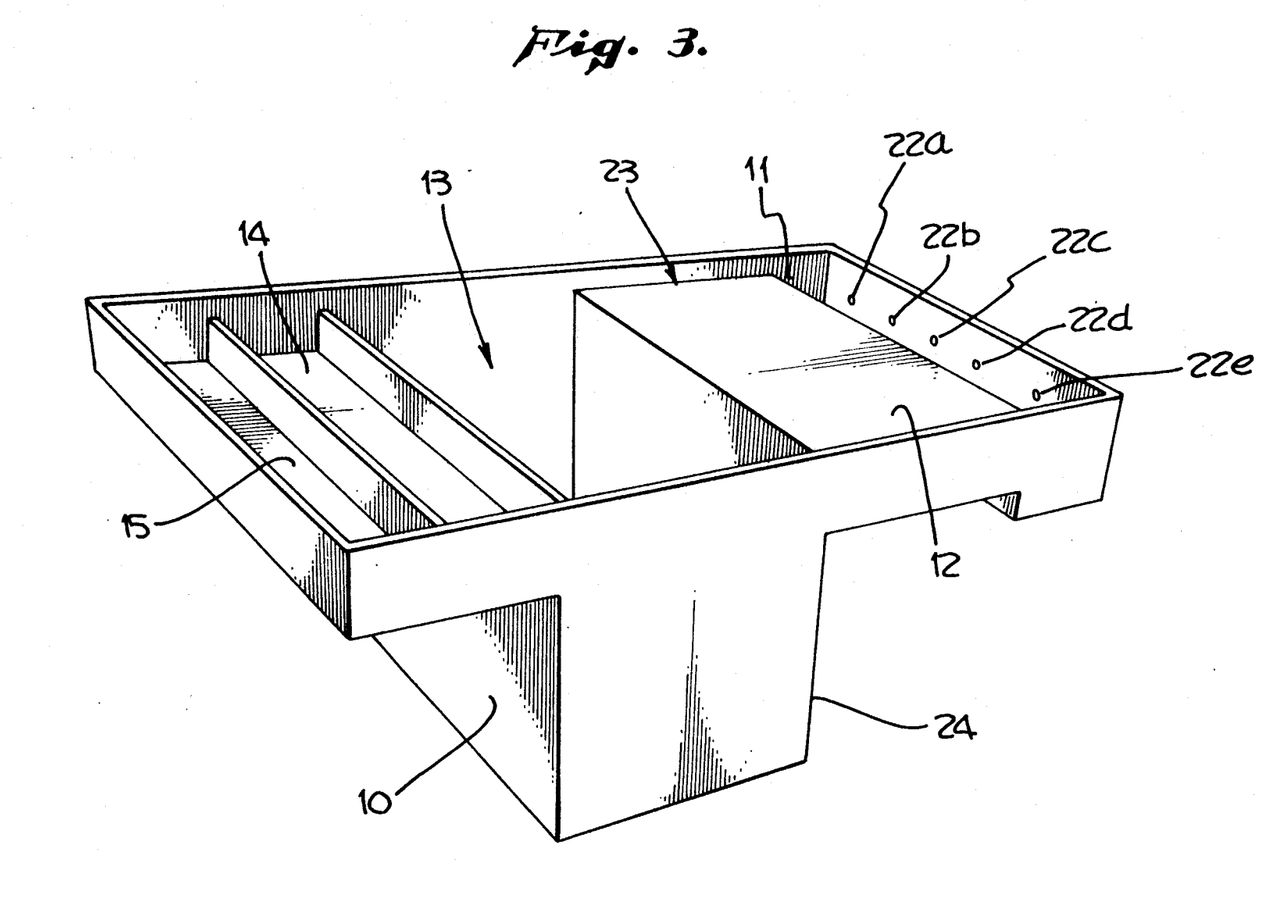
FIG. 3 is a perspective view of the trough of FIGS. 1 or 2.

The following description represents the best presently known mode of carrying out the purpose of the invention. This description is made for the purpose of illustrating the general principles of the invention and is not to be taken in a limiting sense. The scope of the invention is best determined by reference to the appended claims. FIGS. 1, 2 and 3 show a trough 10 filled with a liquid 21. Water is the preferred supporting media, although any liquid capable of supporting and transporting a monomolecular layer is within the scope of this invention.

The particular liquid transport media chosen will depend upon a variety of factors including the chemical interaction of the media with the molecules forming the monomolecular layer. However, for the sake of brevity, the following description will refer to water as the support media.

The water drawn out in the removal zone 15 can either be discarded or recirculated after appropriate filtration and purification. Purification is important in order to maintain a constant system.

The present invention is specifically concerned with an apparatus and method for the formation of a continuous layer of monomolecular film which is achieved by the intermittent removal of unused film so that there is no change in the pressure, consistency or viscosity of the film to be applied to a succession of substrates, or in multiple layers to the same substrate, or a combination of multiple layers applied to many substrates.

In one embodiment of the present invention, the apparatus is specifically designed for use with tractable films. As with any of the embodiments, the oil from which the monomolecular layer is formed is first dissolved in an appropriate solvent, and dropped on to the surface of support media 21 in spreading region 11 by means of a dropper 20. The solvent must be sufficiently volatile in order for it to evaporate quickly, leaving only the monomolecular film 16 on top of the support and transport media 21 when it reaches dipping zone 13 for dipping substrates.

The solvent amphiphilic molecule solution can either be spread continuously or intermittently by dropper 20, depending on whether it is desired that there be film 16 on the surface of the water 21 at all times, or whether a batch method is desired wherein a substrate 26, which can be raised and lowered by a dipping apparatus 25, is initially dipped into pure water 21, followed by spreading the film 16 and pulling the substrate 26 out of the trough 10.

A movement of water 21 from spreading zone 11 toward the compression and dipping zones 12 and 13 is carried out through the introduction of water through water inlets 22, which movement transports the film 16 through compression zone 12 toward dipping zone or region 13. The monomolecular layer 16 is thereby compressed to the desired surface pressure. Water flows more quickly as it passes over raised proton 23 of compression zone 12, then slows and becomes more diffuse when it reaches dipping zone 13, which contains well 24, where it is desired that the film 16 remain steady until dipping is achieved by apparatus 25 attached to the substrate 26.

The Wilhelmy pressure transducer 27 helps maintain the proper conditions by communicating signals to a paddle wheel 28, whose motor is sensitive to signals representing variations of film surface pressure. The transducer 27 is simultaneously attached to a visual display to enable a technician to read the pressure of the film 16. Paddle wheel 28 rotates clockwise and can speed up or slow down as needed in order to maintain constant pressure. At least one of the paddle blades 31 penetrates support media 21 in the first removal region 14 at any given moment, forming a film front 32 beyond which film 16 in the dipping region 13 cannot pass. This results in a buildup of Wilhelmy pressure caused by the constant inflow of water 21 and new film 16 into the dipping region 13.

When equilibrium in the system is reached, which is more likely to occur when there is no dipping, it is likely that paddle wheel 28 will turn at almost a constant RPM. However, as film is removed during the dipping process by substrate 26, it is likely that paddle wheel 28 will turn more slowly, and more intermittently, in order to keep the film pressure constant. However, film must be continuously spread from dropper 20 at such a rate that the paddle wheel 28 continues to remove unused film 16 without causing a drop in film pressure. This is necessary in order to regulate the "dwell time" of the film 16 on the surface of the water 21.

Film 18 which is separated from the film 16 remaining in the first removal zone 14 by paddles 31, is pushed toward the second removal zone 15, where it is removed by aspirator inlets 33, which skim the surface of the support media 21 in the removal region 15. Underwater barriers 34 and 35 are necessary to restrict forward flow of water in the event that the water level in the removal zone 15 were to drop suddenly due to either uneven aspiration, which tends to remove both film 18 and some amounts of water, or by uneven drainage of water through drain 36 located underneath the trough 10 in removal region 15.

Water level throughout the system, and more particularly, the water levee in dipping zone 13, is controlled by means of bidirectional pump 37 connected to water inlet/outlet 38 located at the bottom of well 24. In turn, pump 37 is regulated by a water level transducer 39, thus maintaining a predetermined level of support media 21 necessary to keep the system within the proper conditions.

Water which is removed through drain 36 located in the removal region 15 can either be discarded or recirculated after appropriate filtration and purification. Unused film 18, which is removed by aspirators 33, must be discarded and cannot be reused under present technological conditions. However, any method which recirculates unused film is within the realm of this invention.

In another embodiment of the invention, which is contemplated for use with intractable films 16' almost all of the elements of the system are the same. The method and apparatus for the spreading and compression of film 16' is identical to those of the first embodiment, as is the method and apparatus for water flow and water level regulation. The same apparatus 25 is sued to dip substrate 26 into dipping well 24.

The major difference between the two embodiments is the method and apparatus for removing the unused film. As the intractable film 16' is compressed it forms an almost "solid" sheet across the surface of the water 21 in dipping zone 13. A vacuum cylinder 29 forms a film front 32', while the film 16' can move forward as the cylinder 29 rotates clockwise as viewed in FIG. 2, moving the unused film 18' forward through first removal region 14 toward removal zone 15'. Film front 32' is defined as the line formed where film on top of the support media 21 first comes in contact with cylinder 29.

In order to maintain a constant film pressure, the cylinder 29 speeds up or slows down in response to slight variations in the film pressure as measured by Wilhelmy pressure transducer 27, which is located on the surface of the transport media 21 in dipping region 13. The Wilhelmy pressure transducer 27 communicates to the drive mechanism of the vacuum cylinder 29, and is simultaneously attached to a visual display to enable a technician to read the pressure of the film 16'.

A pulsed vacuum is applied to regions 41(b) and 41(c) inside cylinder 29, which has a surface formed by hydrophilic mesh screen 40, so that the film 16' will adhere to the surface of cylinder 29 only when the vacuum is applied. The vacuum can be controlled in any appropriate manner. One way is by means of a sequence ported rotary vacuum connection.

As cylinder 29 rotates, unused film 18' is carried on the mesh surface 40 of cylinder 29 through first removal zone 14 toward removal zone 15. As cylinder 29 rotates through the interface between cylinder regions 41(c)and 41(d), the vacuum is released. Because mesh surface 40 is hydrophilic, while the hydrophilic ends of the monomolecular layer are oriented toward the water medium, the hydrophobic ends of the monomolecular layer in contact with cylinder 29 will tend not to adhere to cylinder 29, and, more particularly, to the hydrophilic mesh surface 40. The film can then be removed by any appropriate means, any of which are within the purview of this invention. However, the best known method for film removal utilizes a scraper 42, which presses against cylinder 29 at the juncture between cylinder regions 41(c) and 41(d). A conveyor apparatus 43 then carries the unused waste film away to be discarded.

Figure 5:
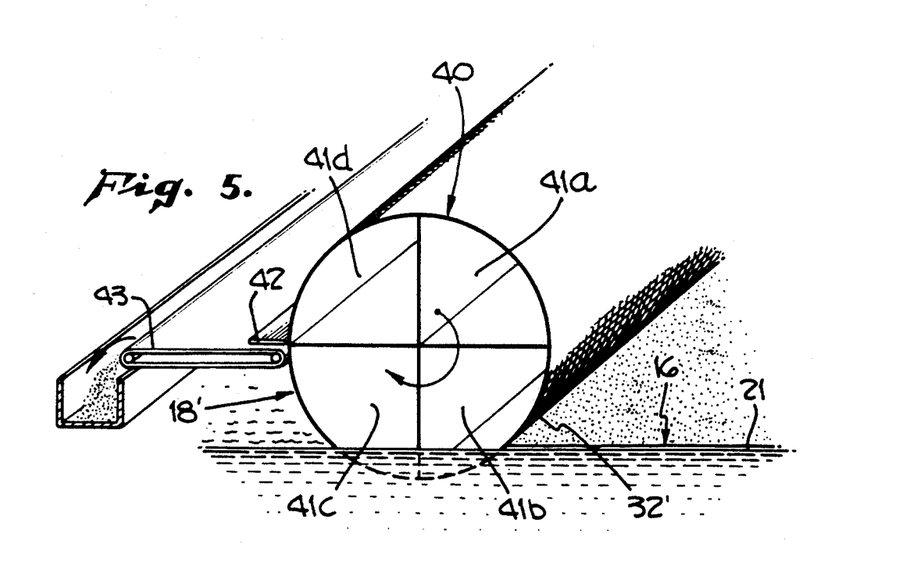
FIG. 5 is a perspective view of the vacuum cylinder drum of FIG. 2.

As the cylinder 29 rotates, the orientation of the cylinder 29 relative to the film surface 16' determines when the vacuum is to applied. As best seen in connection with FIG. 5, as a sector of the screen 40 comes into contact with the film 16', the vacuum is applied, causing the film 16' to adhere to the screen 40 as the cylinder 29 rotates. As the screen 40 at sector 41(c) reaches the scraper blade 42, the vacuum is released, and may be replaced by air or gas under pressure, either of which would assist in film removal. A conveyor 43 removes the film from the vicinity of the cylinder 29.

Figure 4:
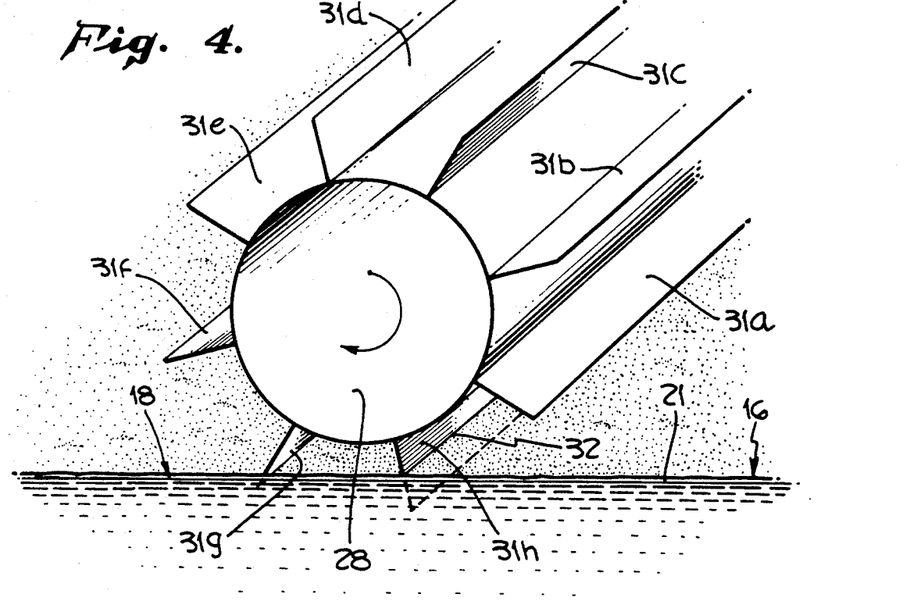
FIG. 4 is a perspective view of the paddle wheel of FIG. 1.

Turning to FIG. 4, there is shown a paddle wheel 29 with a plurality of blades 31. As each blade enters the trough 10, it severs the film and creates the film barrier 32. As soon as a blade clears the water and film, the unused film 18 can be withdrawn by aspirator nozzles 33. The rate at which film 18 is withdrawn is primarily a function of the aspirators 33 and the negative pressure therein. Alternativley, a vacuum system can be coupled to the nozzles 33 and if the pressure is sufficiently low, the film can be efficiently removed.

If the paddle wheel 28 is rotated more rapidly, and the addition of film by dropper 20 is halted, the film 16 can then be completely cleared from the surface of the trough in spreading region 12 and dipping region 13, in order to cleanse the system.

There are many other modes of operation which can be employed with both tractable and intractable films.

What we claim is:

1. Apparatus for forming and depositing a monomolecular layer of amphiphillic molecules on a substrate, including means for forming a monomolecular film on the surface of a liquid carrier, comprising the combination of:
   a. a trough divided into three regions including casting, compression and film removing regions said compression region being of a substantially greater depth than the other regions to allow for the complete immersion of a substrate to be coated;
   b. means for providing a continuous flow of a liquid carrier into said trough to a predetermined depth, said carrier fluid supporting the film and flowing from said casting region to said removal region through said compression region;
   c. rotatable barrier means between said compression and removal regions; and
   d. means for removing unused film from the surface of the carrier fluid in said removal region, whereby said barrier means isolates the film in said compression region from the film in said removal region so that the removal of film does not affect the film in said compression or casting regions.

2. Apparatus as in claim 1, including means for filtering, decontaminating and recirculating carrier fluid from said removal region to said casting region.

3. Apparatus as in claim 1, including means for regulating the height of the carrier fluid, including a height sensor and pumping means connected to said height sensor and responsive thereto for maintaining fluid levels at a predetermined height.

4. Apparatus as in claim 1, wherein said rotatable barrier means include a paddle wheel containing a plurality of paddle blades, arranged so that at least one paddle blade is immersed in the carrier fluid at all times.

5. Apparatus as in claim 4, wherein said means for removing unused film includes aspirator means positioned adjacent the surface of the carrier fluid in said removal region for removing all film in said removal region.

6. Apparatus as in claim 1, wherein said rotatable barrier means include a hollow cylinder whose surface is a thin, hydrophilic mesh permeable to carrier fluid, but virtually impermeable to film molecules, said cylinder being divided into a plurality of zones, each being coupled to a controllable vacuum source.

7. Apparatus as in claim 6, wherein the controllable vacuum source is controlled by ported rotary vacuum connectors.

8. Apparatus as in claim 6, further including a scraper blade adjacent said mesh surface and adapted to remove film adhering to said mesh surface, and further including means for transporting waste film removed by said blade from said system.

9. Apparatus as in claim 8, wherein a vacuum is applied to the interior of said cylinder at the zone including the interface of said cylinder and said compression region for adhering unused film to said mesh surface and wherein the vacuum is removed from the interior of said cylinder at the interface of said cylinder and said scraper blade.

10. Apparatus as in claim 1, further including a Wilhelmy pressure transducer within said compression region, which is coupled to control the rotation of said barrier means for maintaining a predetermined film surface pressure.

11. Apparatus according to claim 1, further including substrate dipping means for lowering a substrate to be coated into said compression region of said trough, and speed control means, for varying the speed with which the substrate is lowered, as a function of the Wilhelmy pressure.

12. A method for forming and depositing a monomolecular layer of amphiphilic molecules on a substrate, from a monomolecular film formed on the surface of a carrier fluid, comprising the steps of:
   a. dividing a receptacle into casting, compression and film removing regions, said compression region being of substantially greater depth than the other regions to allow for the complete immersion of a substrate to be coated;
   b. providing a continuous flow of a carrier fluid into said receptacle to a predetermined depth for supporting the film, said carrier fluid flowing from said casting region to said removal region through said compression region;
   c. interposing a rotatable barrier between said compression and removal regions;
   d. moving a substrate to be coated in and out of said compression region through the carrier fluid and the film, thereby coating the substrate with the film; and
   e. removing unused film from the surface of the carrier fluid in said removal region,
whereby said barrier isolates the film in said compression region from the film in said removal region so that the removal of film does not affect the film in said compression or casting regions.

13. The method of claim 12, including the additional step of filtering, decontaminating and recirculating the carrier fluid from said removal region to said casting region.

14. The method of claim 12, including the additional step of regulating the height of the carrier fluid by coupling a height sensor to pumping means connected to the receptacle and responsive to the height sensor for maintaining the carrier fluid level at a predetermined height.

15. The method of claim 12, wherein said removing step withdraws unused film from the surface of the carrier fluid in said removal region, thereby removing all film in said removal region.

16. The method of claim 12, further including the step of sensing the Wilhelmy pressure within said compression region for controlling the rotation of said rotatable barrier thereby maintaining a predetermined film surface pressure.

17. The method of claim 16, wherein the substrate moving step raises and lowers a substrate to be coated out of and into said compression region of said receptacle, and wherein the speed with which the substrate is raised and lowered is a function of the Wilhelmy pressure.

18. A method of coating a substrate with a monomolecular Langmuir-Blodgett film layer comprising the steps of:
   a. providing a receptacle containing a carrier fluid having a casting region, a compression region and a removal region;
   b. flowing the carrier fluid from the casting region to the removal region;
   c. dipping a substrate to be coated into the carrier fluid in the compression region;
   d. adding a Langmuir-Blodgett fluid film to the surface of the carrier fluid in the casting region so that the motion of the carrier fluid compresses the film in a monomolecular layer against a rotatable barrier interposed between the compression region and the removal region;
   e. withdrawing the substrate, thereby coating the substrate with a monomolecular layer;
   f. rotating the barrier to transport unused film from the compression region to the removal region; and
   g. removing unused film from the surface of the carrier fluid in the removal region.

19. The method of claim 18, further including the step of filtering and recirculating carrier fluid from the removal region to the casting region.

20. The method of claim 18, further including the step of regulating the height of the carrier fluid to maintain a predetermined level.

* * * * *